US009606873B2

(12) United States Patent
Brettell et al.

(10) Patent No.: US 9,606,873 B2
(45) Date of Patent: Mar. 28, 2017

(54) APPARATUS, SYSTEM AND METHOD FOR TEMPORARY COPY POLICY

(71) Applicant: International Business Machines Corporation, Armonk, NY (US)

(72) Inventors: David A. Brettell, Vail, AZ (US); Vanessa R. Earle, Tucson, AZ (US); Alan J. Fisher, Tucson, AZ (US); Duke A. Lee, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 14/276,777

(22) Filed: May 13, 2014

(65) Prior Publication Data

US 2015/0331759 A1 Nov. 19, 2015

(51) Int. Cl.
*G06F 17/30* (2006.01)
*G06F 11/14* (2006.01)
*G06F 11/20* (2006.01)

(52) U.S. Cl.
CPC .......... *G06F 11/1464* (2013.01); *G06F 11/14* (2013.01); *G06F 11/1456* (2013.01); *G06F 11/2094* (2013.01); *G06F 2201/815* (2013.01)

(58) Field of Classification Search
CPC ............. G06F 11/0169; G06F 11/2056; G06F 11/1464
USPC .......... 711/162, 161; 707/764; 714/E11.122; 379/9.05, 221.04
See application file for complete search history.

(56) References Cited

U.S. PATENT DOCUMENTS

| | | | | |
|---|---|---|---|---|
| 6,721,902 | B1* | 4/2004 | Cochran | G06F 11/1456 714/13 |
| 7,489,782 | B1* | 2/2009 | DeVos | G06F 11/1435 380/278 |
| 7,681,072 | B1* | 3/2010 | Gibson | G06F 11/1092 714/6.22 |
| 7,774,094 | B2 | 8/2010 | Kishi et al. | |
| 7,809,691 | B1* | 10/2010 | Karmarkar | G06F 11/1469 707/674 |
| 7,925,626 | B2 | 4/2011 | Stock et al. | |
| 8,019,723 | B2 | 9/2011 | Bish et al. | |
| 8,112,396 | B2* | 2/2012 | Zak | G06F 11/1469 707/640 |
| 8,140,788 | B2 | 3/2012 | Niranjan et al. | |
| 8,140,791 | B1 | 3/2012 | Greene | |
| 8,161,233 | B2 | 4/2012 | Wang | |
| 8,214,611 | B2 | 7/2012 | Amano | |
| 8,234,253 | B1* | 7/2012 | Tyurin | G06F 11/1438 707/675 |
| 8,261,033 | B1 | 9/2012 | Slik et al. | |
| 8,521,975 | B2 | 8/2013 | Bish et al. | |
| 8,572,311 | B1 | 10/2013 | Shalvi et al. | |

(Continued)

*Primary Examiner* — Baoquoc N To
(74) *Attorney, Agent, or Firm* — Zilka-Kotab, PC

(57) ABSTRACT

A method according to one embodiment includes copying data incoming to and/or generated at a production site to a copy cluster at a remote copy site, thereby creating a redundant copy of the data at the copy cluster. When the copy cluster becomes unavailable, data incoming to and/or generated at the production site is copied to a backup reserve site after the copy cluster becomes unavailable. Additional systems, methods, and computer programs products are also presented.

16 Claims, 11 Drawing Sheets

(56) References Cited

U.S. PATENT DOCUMENTS

| | | | |
|---|---|---|---|
| 9,031,910 B2* | 5/2015 | Driesen | G06F 17/30356 707/610 |
| 2002/0035559 A1* | 3/2002 | Crowe | G06F 17/30321 |
| 2003/0005244 A1* | 1/2003 | Markkanen | H04L 67/1095 711/162 |
| 2004/0078641 A1* | 4/2004 | Fleischmann | G06F 11/1469 714/6.12 |
| 2004/0193950 A1* | 9/2004 | Gagne | G06F 11/1471 714/6.31 |
| 2006/0031407 A1* | 2/2006 | Dispensa | H04L 29/12009 709/219 |
| 2007/0038682 A1* | 2/2007 | Kulesza | G06F 11/1469 |
| 2008/0034019 A1* | 2/2008 | Cisler | G06F 11/1451 |
| 2008/0052327 A1 | 2/2008 | Buah | |
| 2008/0154989 A1* | 6/2008 | Arman | G06F 11/1464 |
| 2008/0209142 A1* | 8/2008 | Obernuefemann | G06F 11/1456 711/161 |
| 2009/0222929 A1* | 9/2009 | Noguchi | G06F 11/1458 726/27 |
| 2010/0040205 A1* | 2/2010 | Amidi | H04Q 3/0075 379/9.05 |
| 2010/0064168 A1* | 3/2010 | Smoot | G06F 11/2069 714/6.12 |
| 2010/0115215 A1* | 5/2010 | Rosychuk | G06F 11/1456 711/162 |
| 2010/0332454 A1 | 12/2010 | Prahlad et al. | |
| 2011/0055593 A1* | 3/2011 | Lurey | G06F 21/31 713/193 |
| 2012/0047341 A1* | 2/2012 | Ishinabe | G06F 11/1451 711/162 |
| 2012/0324183 A1 | 12/2012 | Chiruvolu et al. | |
| 2014/0157390 A1* | 6/2014 | Lurey | G06F 21/123 726/7 |
| 2014/0215173 A1* | 7/2014 | Clark | G06F 12/16 711/162 |
| 2015/0186070 A1* | 7/2015 | Miller | G06F 3/0647 711/162 |
| 2015/0269041 A1* | 9/2015 | Long | H04L 67/1095 714/4.11 |

\* cited by examiner

APPARATUS, SYSTEM AND METHOD FOR TEMPORARY COPY POLICY

BACKGROUND

The present invention relates to data storage systems, and more specifically, this invention relates to data storage systems able to facilitate availability of at least two copies of user data at a given time.

In current storage systems that allow for backup of original data to an attached device, when that attached device is unavailable to receive and/or process backup requests, those backup requests are backlogged. As a result, the backlogged backup requests are not completed, and only one copy of the data (i.e., the original data itself) is available, e.g., to a host.

BRIEF SUMMARY

A method according to one embodiment includes copying data incoming to and/or generated at a production site to a copy cluster at a remote copy site, thereby creating a redundant copy of the data at the copy cluster. When the copy cluster becomes unavailable, data incoming to and/or generated at the production site is copied to a backup reserve site after the copy cluster becomes unavailable.

A computer program product according to one embodiment includes a computer readable storage medium having program instructions embodied therewith. The program instructions are readable and/or executable by a device to cause the device to copy data incoming to and/or generated at a production site to a copy cluster at a remote copy site, thereby creating a redundant copy of the data at the copy cluster. When the copy cluster becomes unavailable, data incoming to and/or generated at the production site after the copy cluster becomes unavailable is copied to a backup reserve site.

A system according to one embodiment includes a processor and logic integrated with and/or executable by the processor. The logic is configured to copy data incoming to and/or generated at a production site to a copy cluster at a remote copy site, thereby creating a redundant copy of the data at the copy cluster; and when the copy cluster becomes unavailable, copy data incoming to and/or generated at the production site after the copy cluster becomes unavailable to a backup reserve site.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating backup copies of data, despite potentially backlogged backup requests. It follows that various embodiments described herein include a data storage system network capable of improving data processing rates for backup and/or copy requests.

In one general embodiment, a method includes copying data incoming to and/or generated at a production site to a copy cluster at a remote copy site, thereby creating a redundant copy of the data at the copy cluster. When the copy cluster becomes unavailable, data incoming to and/or generated at the production site is copied to a backup reserve site after the copy cluster becomes unavailable.

In another general embodiment, a computer program product includes a computer readable storage medium having program instructions embodied therewith. The program instructions are readable and/or executable by a device to cause the device to copy data incoming to and/or generated at a production site to a copy cluster at a remote copy site, thereby creating a redundant copy of the data at the copy cluster. When the copy cluster becomes unavailable, data incoming to and/or generated at the production site after the copy cluster becomes unavailable is copied to a backup reserve site.

In yet another general embodiment, a system includes a processor and logic integrated with and/or executable by the processor. The logic is configured to copy data incoming to and/or generated at a production site to a copy cluster at a remote copy site, thereby creating a redundant copy of the data at the copy cluster, and when the copy cluster becomes unavailable, copy data incoming to and/or generated at the production site after the copy cluster becomes unavailable to a backup reserve site.

Figure 1:
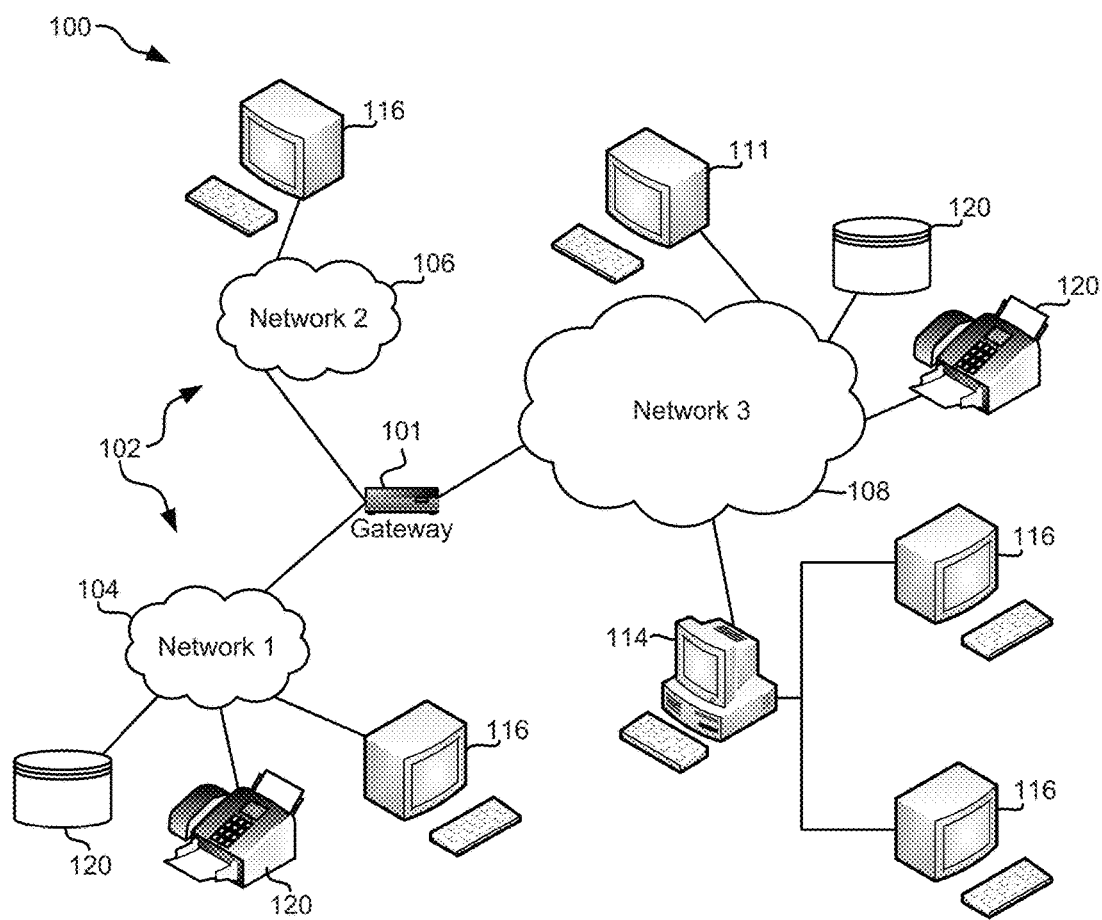
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
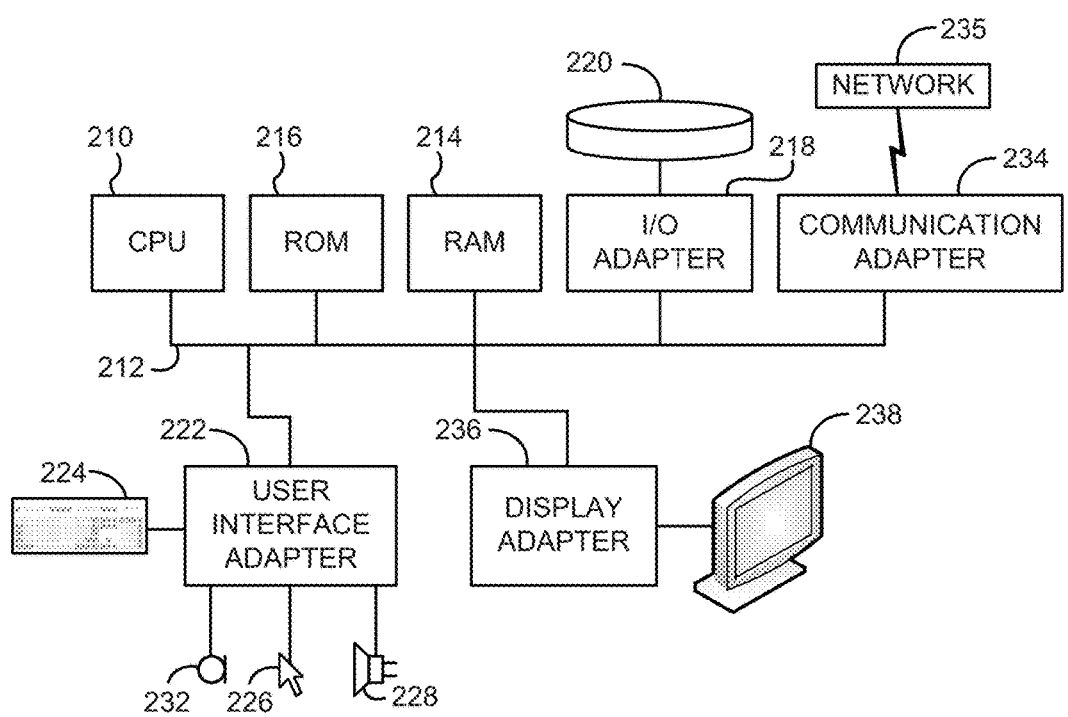
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
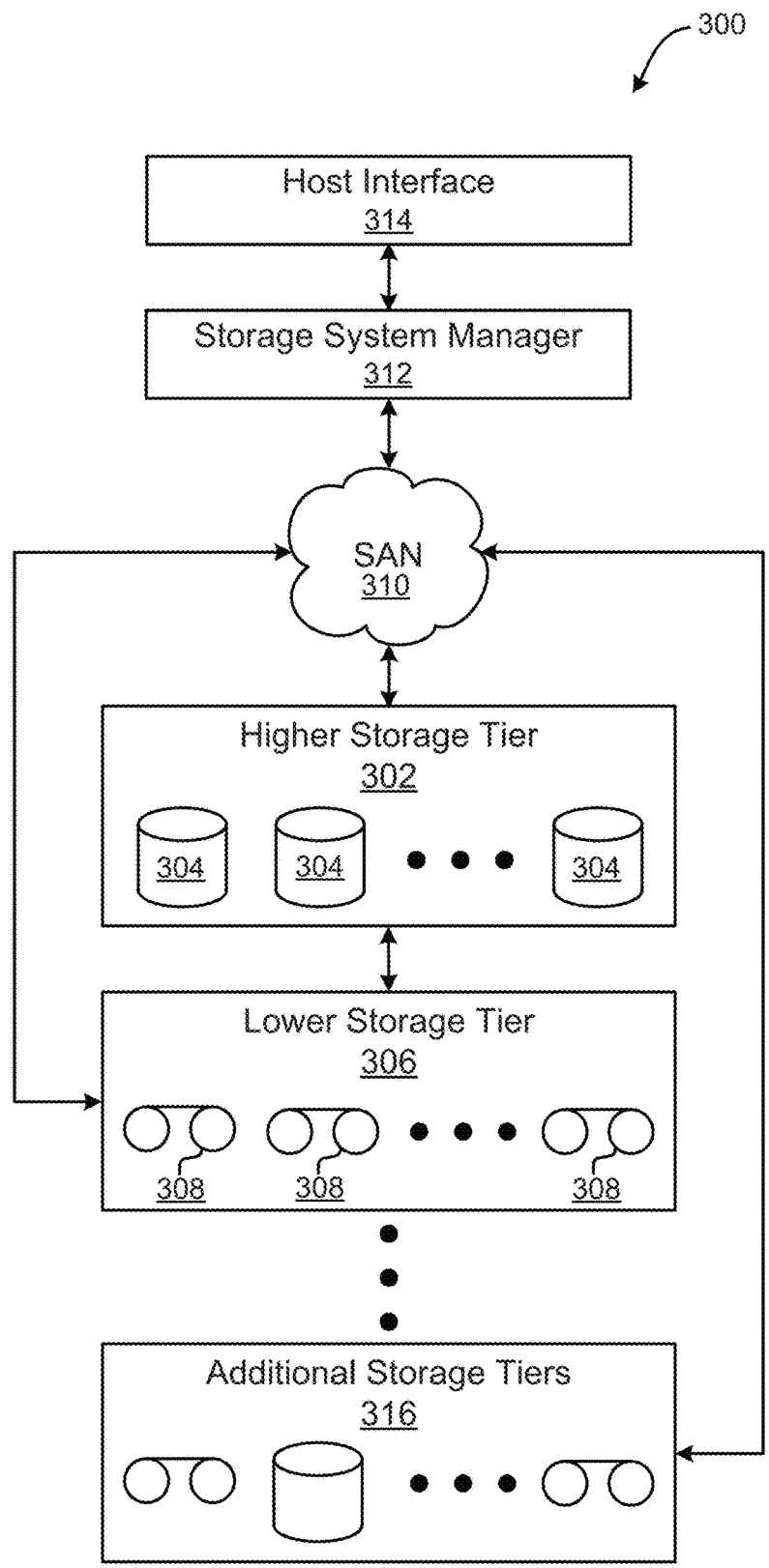
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media (e.g., see 304), such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments. As will soon become apparent, data storage systems and/or network architectures may be implemented to perform methods for copying data incoming to and/or generated at a production site, e.g., see method 500 of FIG. 5 below.

As previously mentioned, conventional storage systems that allow for backup of original data to an attached device become backlogged when that attached device is unavailable to receive and/or process backup requests. As a result, the backlogged backup requests are not completed, and only one copy of the data (i.e., the original data itself) is available, e.g., to a host. This exposes the host to a serious vulnerability should the original data be lost, e.g., if a master site, storing the original data, goes down.

In conventional tape attached storage systems, to perform a backup of host data, the host data is first written to a tape volume cache. As the cache usage increases, the data is migrated from the cache to tape cartridges where the backup copies of the host data are thereby created. However, when data cannot be placed on tape cartridges, e.g., due to problems with the tape library, the tape volume cache fills up and the attached host input/output (I/O) is throttled. Eventually, the host I/O becomes so slow that the host jobs actually come to a halt, thereby preventing backup of any host data. As previously mentioned, this is highly undesirable as it exposes the host to a serious vulnerability should the original host data be lost.

In sharp contrast, various embodiment described herein are able to create backup copies of data, despite potentially backlogged backup requests. It follows that various embodiments described herein include a data storage system network capable of improving data processing rates for backup and/or copy requests of user (also referred to herein as a "host") data.

Figure 4:
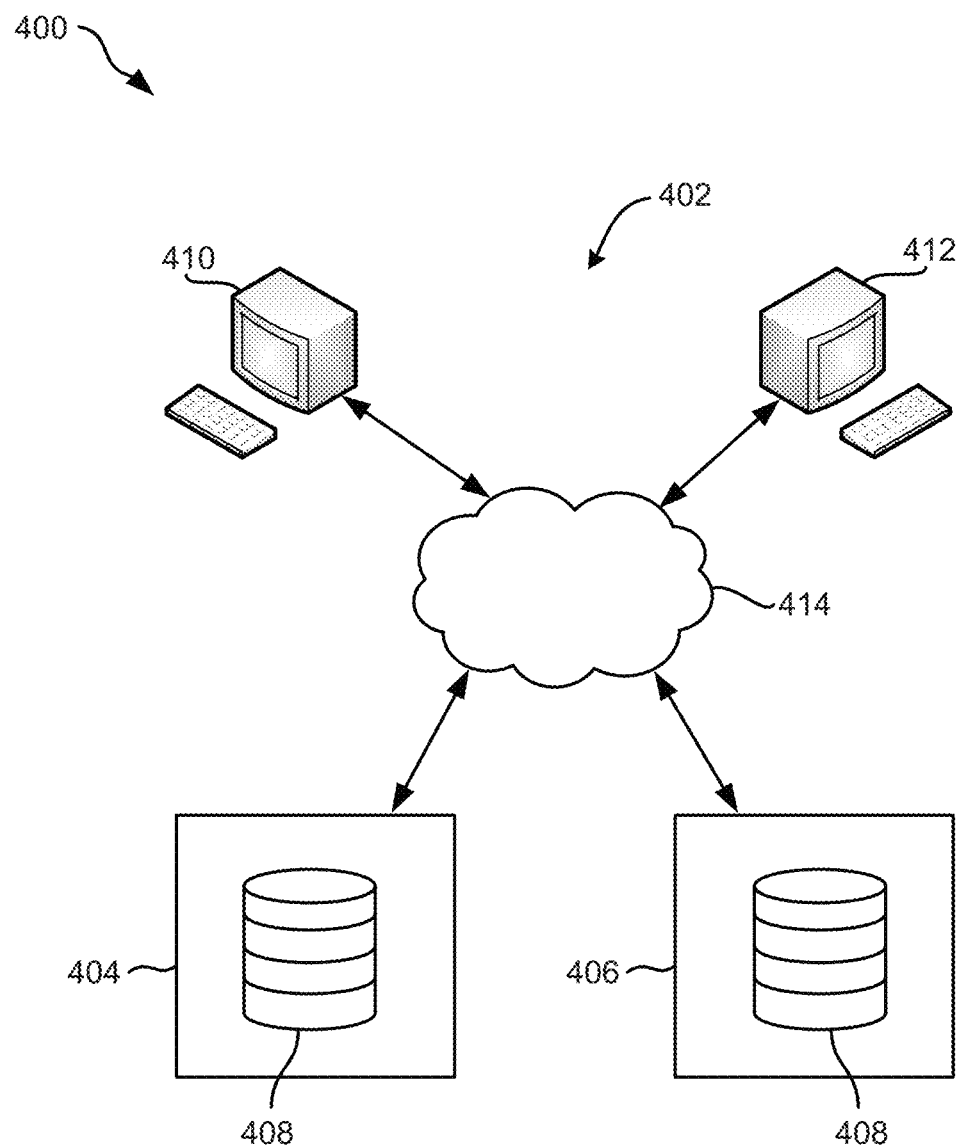
FIG. 4 is a representational diagram of a storage network according to one embodiment.

Looking to FIG. 4, an exemplary storage network 400 is depicted according to one embodiment. As an option, the present storage network 400 may be implemented in conjunction with features from any other embodiment listed herein, such as those described with reference to the other FIGS., such as FIG. 1.

Of course, however, such storage network 400 and others presented herein may be used in various applications and/or in permutations which may or may not be specifically described in the illustrative embodiments listed herein. Further, the storage network 400 presented herein may be used in any desired environment. Thus FIG. 4 (and the other FIGS.) should be deemed to include any and all possible permutations.

As illustrated in FIG. 4, the storage network 400 includes user devices 410, 412 at a production site 402, which can be any site where data is created and/or received. According to one approach, the production site 402 may be located at a production center, e.g., where the majority of a company's infrastructure is located. In another approach, the production site 402 may be located where a company's primary operations occur, e.g., where business applications are actually creating data content.

As mentioned above, user devices 410, 412 (e.g., see 116 of FIG. 1) may include a desktop computer, lap-top computer, hand-held computer, printer or any other type of logic based device. Storage network 400 also includes remote copy site 404 and backup reserve site 406 which have data storage devices 408. Data storage devices may include tape based storage devices, disk based storage devices, etc., or any other type of data storage device which would be apparent to one skilled in the art upon reading the present description. Moreover, data storage devices 408 at remote copy site 404 and backup reserve site 406 may be the same or different types of data storage devices, depending on the desired embodiment.

It should be noted that although the remote copy site 404 and backup reserve site 406 are illustrated as being located at separate locations in accordance with a preferred embodiment, in other embodiments, the remote copy site 404 and backup reserve site 406 may be separate entities located at the same geographical location. For example, the remote copy site 404 may be located on a storage bank in a warehouse, while the backup reserve site 406 may be located on a different storage bank in the same warehouse. Therefore, although only the remote copy site 404 and backup reserve site 406 are illustrated as being connected to the network 414, multiple other potential data storage sites may also be coupled to network 414. It follows that, depending on the desired embodiment, the remote copy site 404 and backup reserve site 406 locations may be chosen from multiple data storage sites, based on one or more predefined criteria, as will be described in further detail below.

Referring still to FIG. 4, remote copy site 404 and backup reserve site 406 are connected to the production site 402 via a network 414 that is preferably configured to facilitate the transfer of data therebetween. Thus, according to some approaches, both user devices 410, 412 may send data to one of the backup reserve site 406 or the remote copy site 404. In other approaches user device 410 may send data exclusively to backup reserve site 406 and user device 412 may send data exclusively to remote copy site 404, or vice versa. In yet further approaches, both user devices 410, 412 may send data to both the backup reserve site 406 and the remote copy site 404.

It follows that network 414 preferably provides an interconnected relationship between the user devices 410, 412 of the production site 402 and the backup reserve site 406 and the remote copy site 404. Thus, network 414 may connect the user devices 410, 412 of the production site 402, the backup reserve site 406 and the remote copy site 404 in a grid-type system. According to various embodiments, network 414 may include any of the approaches described and/or suggested above, e.g., see 102, 104, 106, 108 of FIG. 1.

The storage network 400 of FIG. 4 may be operated using a Sysplex configuration known in the art. In one approach, the storage network 400 has a Geographically Dispersed Parallel Sysplex (GDPS) configuration. Moreover, it is preferred that the storage network 400 is able to implement one or more of the method steps of FIG. 5 as will be described in detail below.

Figure 5:
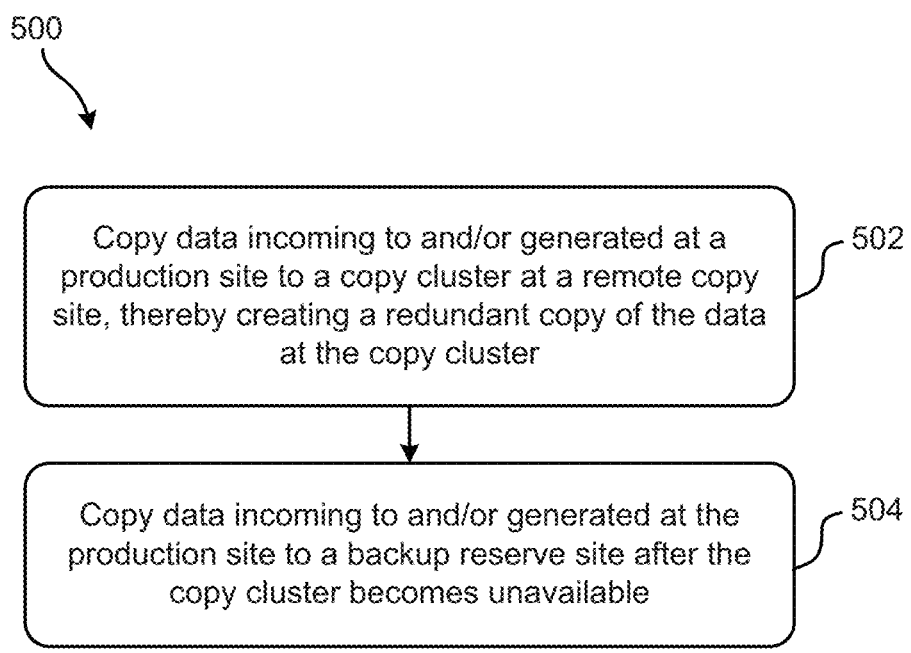
FIG. 5 is a flow chart of a method according to one embodiment.

FIG. 5 depicts a method 500, in accordance with one embodiment. As an option, the present method 500 may be implemented in conjunction with features from any other embodiment listed herein, such as those described with reference to the other FIGS. Of course, however, such method 500 and others presented herein may be used in various applications and/or in permutations which may or may not be specifically described in the illustrative embodiments listed herein. Further, the method 500 presented herein may be used in any desired environment. Thus FIG. 5 (and the other FIGS.) should be deemed to include any and all possible permutations.

Referring now to FIG. 5, method 500 includes copying data incoming to and/or generated at an originating cluster at a production site to a copy cluster at a remote copy site, thereby creating a redundant copy of the data at the copy cluster. See operation 502.

Moreover, when the copy cluster becomes unavailable, e.g., for any expected and/or unexpected reason, operation 504 of method 500 includes copying data incoming to and/or generated at the production site to a backup reserve site after the copy cluster becomes unavailable. It may be desirable for the data incoming to and/or generated at the production site to be copied to a backup reserve site immediately after the copy cluster becomes unavailable, e.g., upon detecting the copy cluster becomes unavailable. However, in other approaches, the data incoming to and/or generated at the production site to be copied to a backup reserve site after a period of time after the copy cluster becomes unavailable, upon failed attempts to revive the unavailable copy cluster, etc.

It is preferred that the production site, remote copy site and backup reserve site of method 500 are connected in a grid-type system, e.g., as described above with reference to network 400 of FIG. 4. Moreover, as described above, the remote copy site and backup reserve site may have any one of a number of physical configurations. For example, the remote copy site and backup reserve site may be separate entities located at the same geographical location. However, in other embodiments, the remote copy site and backup reserve site may be separate entities located at separate geographical locations.

It follows that in some embodiments, method 500 may optionally include selecting the backup reserve site from a plurality of backup reserve sites based on predefined criteria. Moreover, selecting the backup reserve site from a plurality of backup reserve sites may be achieved by using an algorithm that incorporates said predefined criteria. According to various approaches, the predefined criteria may include distance from the remote copy site and/or production site, data storage size (e.g., capacity), data storage media, data protection and/or security, data traffic, health, bandwidth, presence of back-end tape, etc. of the backup reserve site. According to some approaches, it may be desirable that the backup reserve site be selected based on the number of similarities between it and the unavailable remote copy site. In other approaches, it may be preferred that the backup reserve site is geographically located as far from the production site as possible, e.g., in order to enforce distance between replicas of data.

Figure 6A:
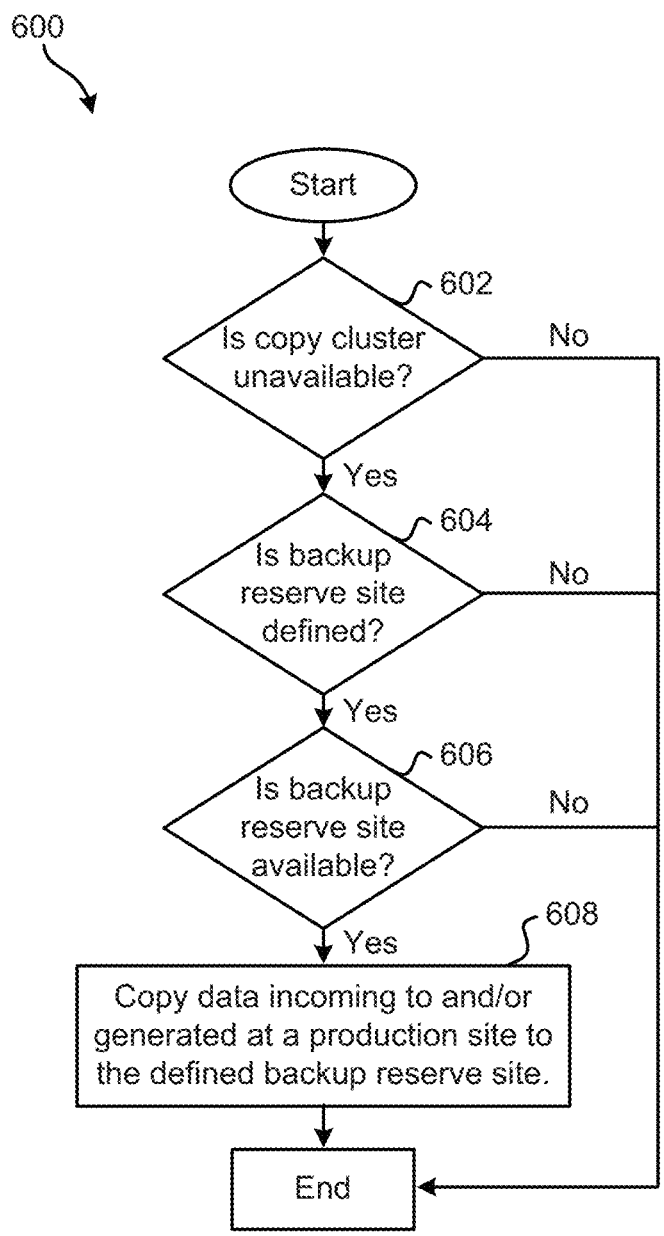
FIG. 6A is a flow chart of a method according to one embodiment.

FIG. 6A illustrates an exemplary flowchart of a method 600 for copying data incoming to and/or generated at a production site to a backup reserve site if a copy cluster becomes unavailable, according to an exemplary embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment. Thus FIG. 6A (and the other FIGS.) should be deemed to include any and all possible permutations.

Referring now to FIG. 6A, operation 602 of method 600 includes determining whether a copy cluster is unavailable, e.g., according to any of the approaches described herein. If the determination of operation 602 results in a "Yes", then method 600 proceeds to operation 604 which determines if a backup reserve site has been defined (e.g., selected). Moreover, if operation 604 results in a "Yes", method 600 proceeds to operation 606 in which method 600 determines whether the defined backup reserve site is available. Finally, if operation 606 results in a "Yes", method 600 proceeds to operation 608 in which data incoming to and/or generated at a production site is copied to the defined backup reserve site, whereby method 600 is completed.

Looking still to FIG. 6A, if any of operations 602, 604 or 606 result in a "No", operation 608 is bypassed, and method 600 is automatically completed. Furthermore, it should be noted that "Yes" and "No" according to the present description of FIG. 6A are presented by way of example only and are in no way intended to limit the invention. "Yes" and "No" are intended to represent a logical state that may be represented by any other form, e.g., logical values "1" and "0".

Referring back to FIG. 5, once the copy cluster becomes available again (e.g., is recovered), different post recovery options may be implemented, depending on the desired embodiment. According to one approach, the backup reserve site may be set in the system as a new primary remote copy site for the production site when the copy cluster becomes unavailable. In other words, when the copy cluster becomes unavailable, the backup reserve site may be designated as the new primary remote copy site, e.g., despite whether or not the copy cluster becomes available again. Thus, when the copy cluster becomes available again, the copy cluster may be designated as the new backup reserve site, e.g., for if the new primary remote copy site becomes unavailable.

In one approach, the backup reserve site may be set in the system as the new primary remote copy site corresponding to a long term degraded state of the copy cluster at the previous remote copy site. However, in another approach, the backup reserve site may be set in the system as the new primary remote copy site if the copy cluster at the previous remote copy site becomes full and cannot store any data therein. Furthermore, according to different approaches, the backup reserve site may be set in the system as the new primary remote copy site for the production site if the backup reserve site is sufficiently similar to the previous remote copy site.

However, for other post recovery options, once the copy cluster becomes available again, new data incoming to and/or generated at the production site may be copied to the copy cluster at the remote copy site while copying data to the backup reserve site may be discontinued. According to the present description, copying data to the backup reserve site is preferably discontinued after any outstanding copy requests at the backup reserve site are processed. For example, if the backup reserve site has a cache for processing copy requests, the copying data to the backup reserve site is preferably discontinued after the copy requests in the cache have been performed.

Moreover, once the copy cluster becomes available again, data previously copied to the backup reserve, while the copy cluster was unavailable, may be maintained at the backup reserve as a redundant copy of the data on the production site. Thus, in some approaches, data previously copied to the backup reserve may not be transferred from the backup reserve to the remote copy site.

However, in other approaches, once the copy cluster becomes available again, the data stored on the backup reserve site may be copied to the copy cluster of the remote copy site when the copy cluster becomes available. In such approaches, the data stored on the backup reserve site may be copied to the copy cluster at a time that is preferably based on activity at the copy cluster of the remote copy site. For example, the data stored on the backup reserve site may be copied to the copy cluster when the copy cluster is experiencing copy request workloads below a threshold, e.g., determined by a user, based on the type of data being generated, predefined, etc. Thus, when the data stored on the backup reserve site is copied to the copy cluster may be based, at least in part on, one or more of a write cache level, number of incoming writes, low cycle times, low priority workload, etc. of the copy cluster. As a result, copying data stored on the backup reserve site to the copy cluster may desirably not impact production workloads and their recovery point objectives as would be appreciated by one skilled in the art upon reading the present description.

Furthermore, upon copying the data stored on the backup reserve site to the copy cluster of the remote copy site when the copy cluster becomes available, the data stored on the backup reserve site may be deleted. This desirably ensures there are no unnecessary copies of data. However, in other approaches, a third copy of the data may be desired, e.g., for instances involving highly valuable data.

Moreover, the temporary ownership of each temporary copy at the backup reserve site may become a permanent ownership by the copy cluster as each copy transfer completes, and the temporary ownership of each temporary copy at the backup reserve site may be removed as each copy transfer completes. The production site is made aware of the ownership transfer between the backup reserve site and the copy cluster.

In one approach, a temporary ownership of the data at the backup reserve site is removed when the data is copied to the copy cluster, and a permanent ownership of the data by the copy cluster is set when the copying completes. An indication that the ownership of the copied data resides with the copy cluster is sent to the production cluster.

Figure 6B:
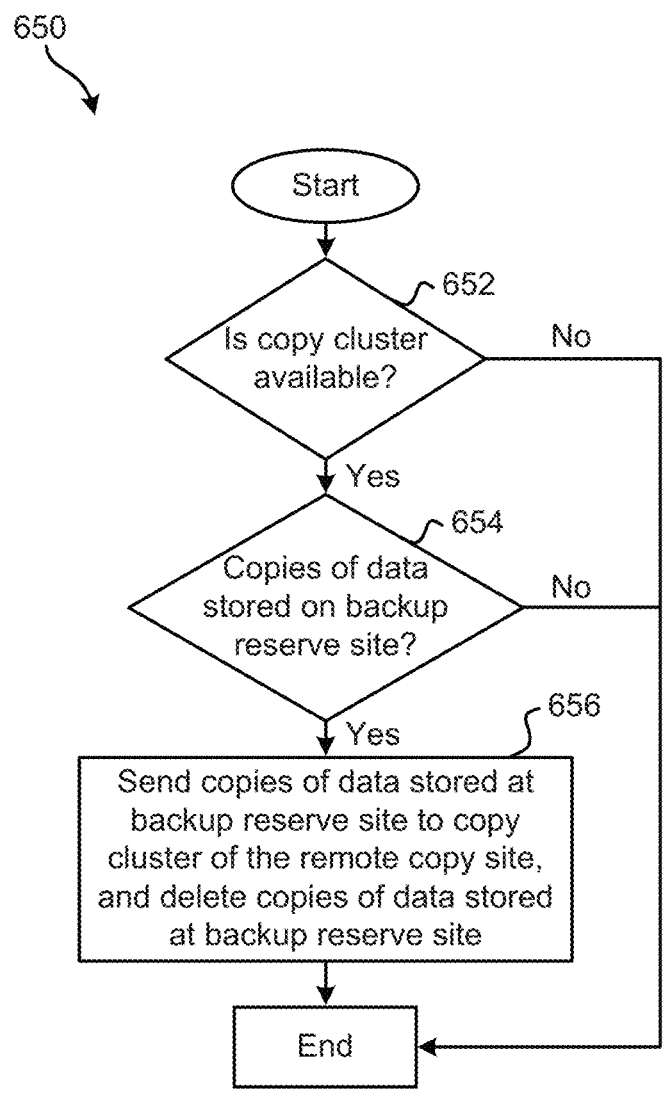
FIG. 6B is a flow chart of a method according to one embodiment.

FIG. 6B illustrates an exemplary flowchart of a method 650 for copying data stored on a backup reserve site to a copy cluster of a remote copy site when the copy cluster becomes available according to an exemplary embodiment. As an option, the present method 650 may be implemented in conjunction with features from any other embodiment listed herein, such as those described with reference to the other FIGS. Of course, however, such method 650 and others presented herein may be used in various applications and/or in permutations which may or may not be specifically described in the illustrative embodiments listed herein. Further, the method 650 presented herein may be used in any desired environment. Thus FIG. 6B (and the other FIGS.) should be deemed to include any and all possible permutations.

Referring now to FIG. 6B, the flowchart of a method 650 includes determining whether the copy cluster of a remote copy site is available. See operation 652. If the determination of operation 652 results in a "Yes", then method 650 proceeds to operation 654 which determines if there are copies of data stored at a backup reserve site. Moreover, if operation 654 results in a "Yes", method 650 proceeds to operation 656 in which the copies of data stored at a backup reserve site are sent to the copy cluster of the remote copy site, and the copies of data stored at a backup reserve site are deleted, whereby method 650 is completed.

Referring still to FIG. 6B, if either operation 652 or 654 result in a "No", operation 656 is bypassed, and method 650 is automatically completed. Furthermore, it should be noted that "Yes" and "No" according to the present description of FIG. 6B are presented by way of example only and are in no way intended to limit the invention. "Yes" and "No" are intended to represent a logical state that may be represented by any other form, e.g., logical values "1" and "0".

Keeping in mind the operational steps of FIG. 5, the following description presents an exemplary in-use embodiment of the storage network 400 of FIG. 4, which is in no way intended to limit the invention. According to the exemplary in-use embodiment, a host may be generating (e.g., writing) data at a production site 402. An original copy of the data generated at the production site 402 is preferably saved to memory at the production site 402, e.g., on internal memory of the user devices 410, 412. However, in other approaches, the user devices 410, 412 may further be connected to data storage devices at the production site 402, e.g., see FIG. 1, whereby and an original copy of the data generated at the production site 402 may be saved to the aforementioned data storage devices.

Furthermore, the data generated at the production site 402 is also preferably copied to a copy cluster at a remote copy site 404, e.g., via network 414. According to the present in-use embodiment, the remote copy site 404 includes a disk cache, but is in no way limited thereto. Thus, to copy the generated data from the production site 402 to the remote copy site 404, the data is first added to a disk cache of remote copy site 404. Thus, as the data is copied to the disk cache of remote copy site 404, the data is also being migrated to a copy cluster, e.g., tape cartridges, at the remote copy site 404.

However, when the disk cache of remote copy site 404 experiences a problem, e.g., an overflow of processing requests, copy requests of the data cannot be off-loaded from the disk cache to the copy cluster at the remote copy site 404, and as a result, the disk cache begins to fill up with data to be copied from the production site 402. Yet, in the present in-use embodiment, when the remote copy site 404 problem occurs, remote copy site 404 preferably stops accepting copy requests from production site 402, which are instead redirected to the backup reserve site 406. As a result, backup reserve site 406 is able to create and store copies of the data generated at the production site 402, thereby improving production workload and enabling data redundancy in case of a disaster, e.g., partial and/or complete loss of an original copy of data.

Moreover, once the problem at the disk cache of remote copy site 404 is fixed, e.g., a sufficient number of the overflow of processing requests are addressed, the storage network 400 may implement any of the post recovery options as described above with reference to method 500 of FIG. 5.

Figure 7:
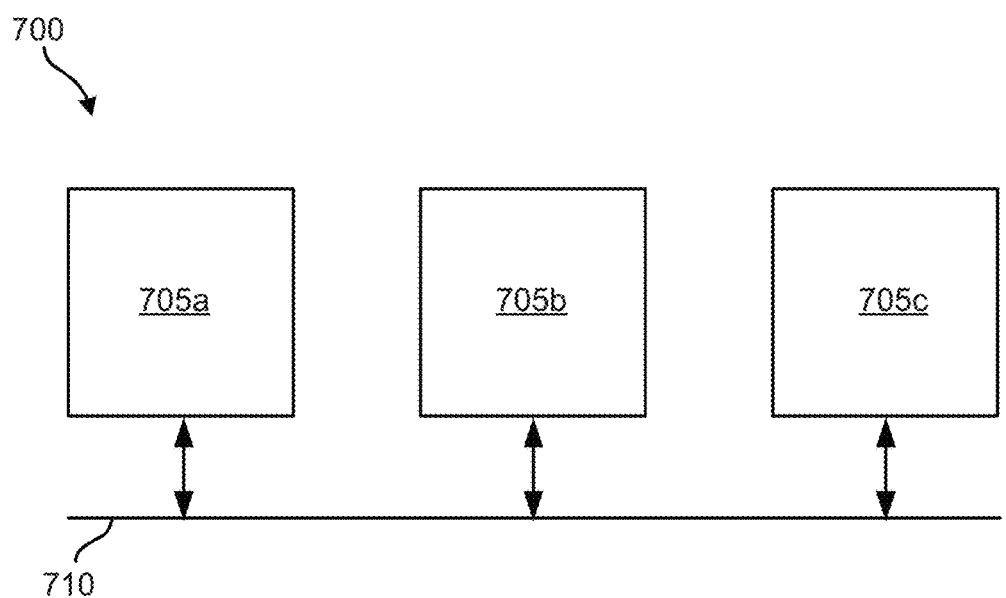
FIG. 7 is a schematic block diagram of distributed sites according to one embodiment.
Figure 8A:
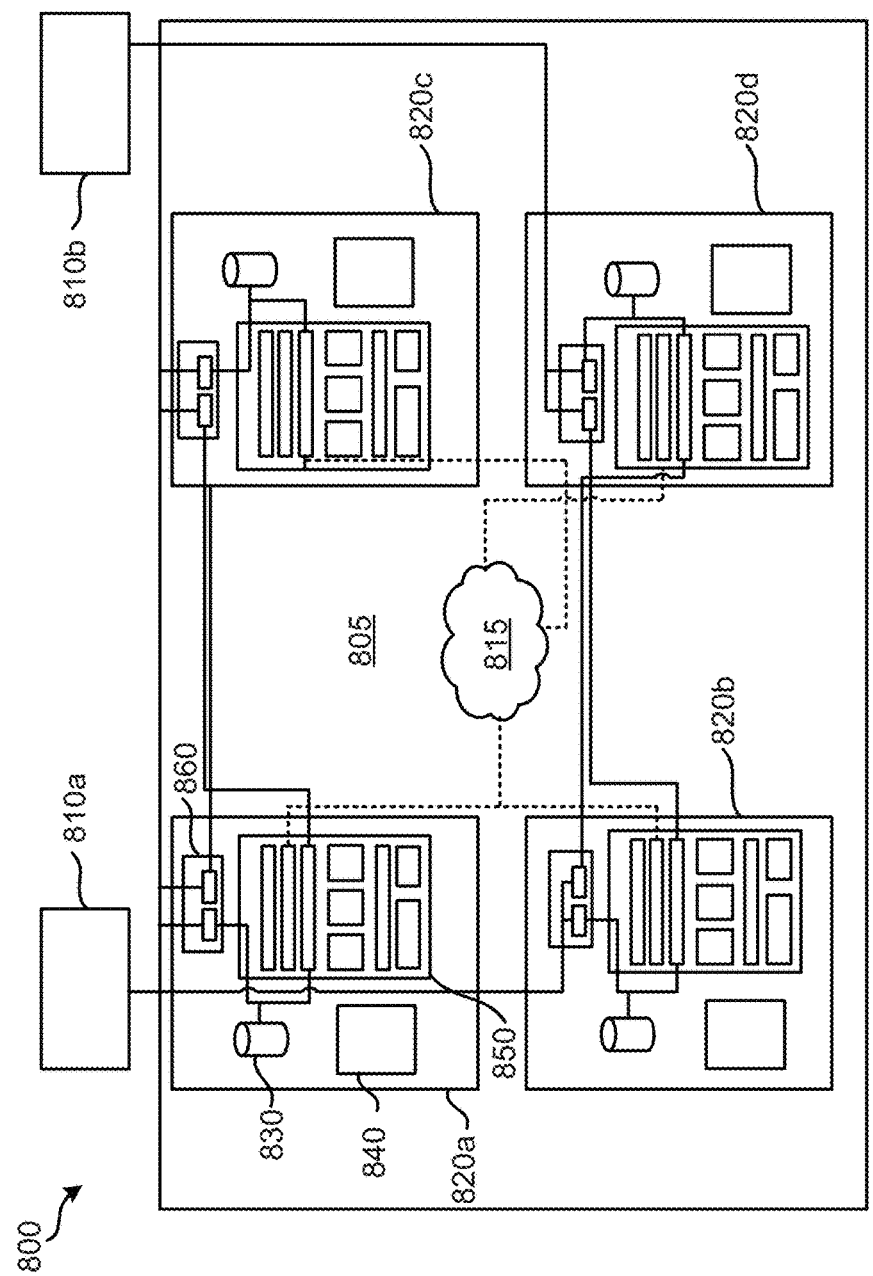
FIGS. 8A-8B are schematic block diagrams of a storage system according to one embodiment.
Figure 8B:
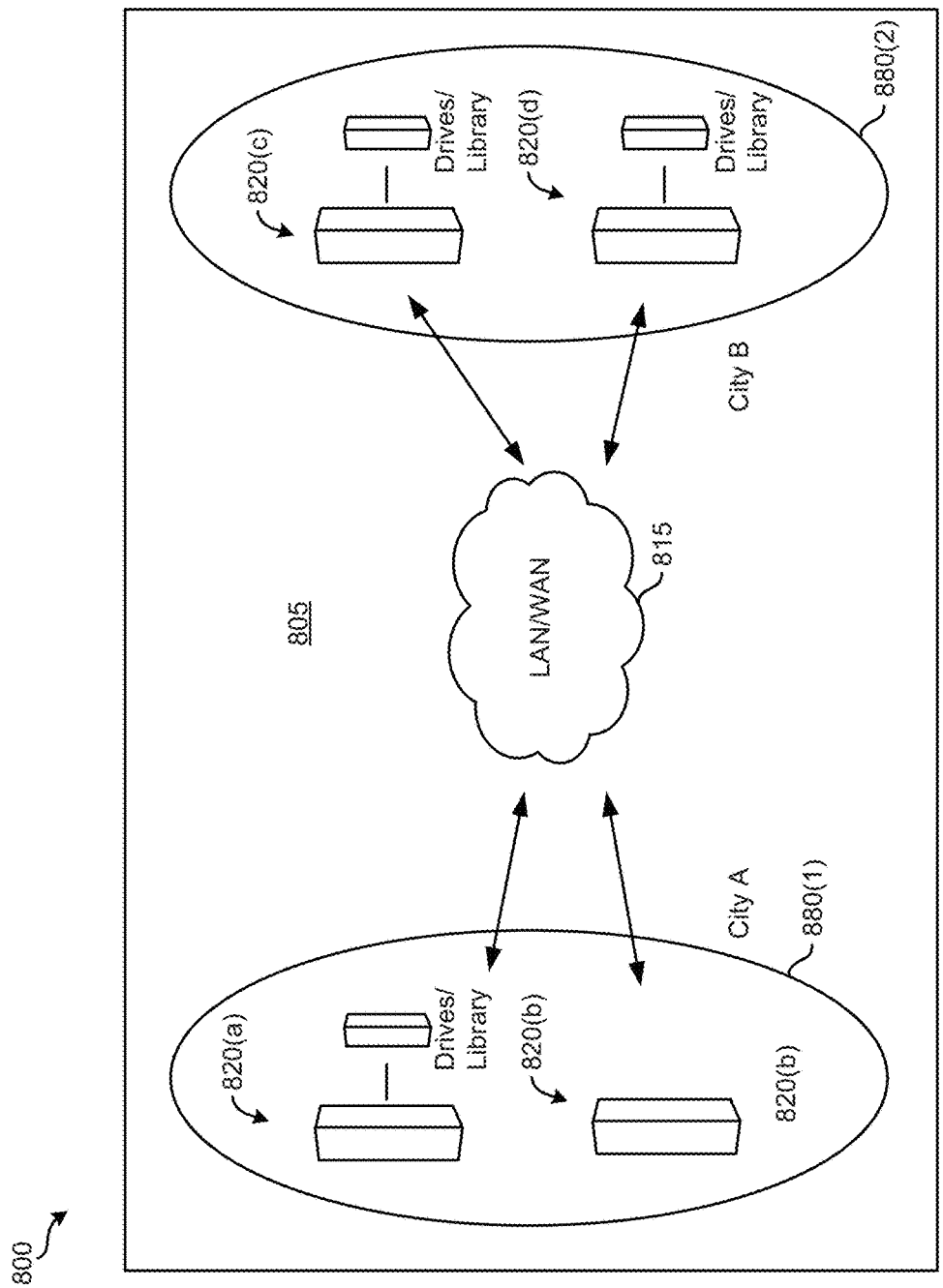
Figure 9:
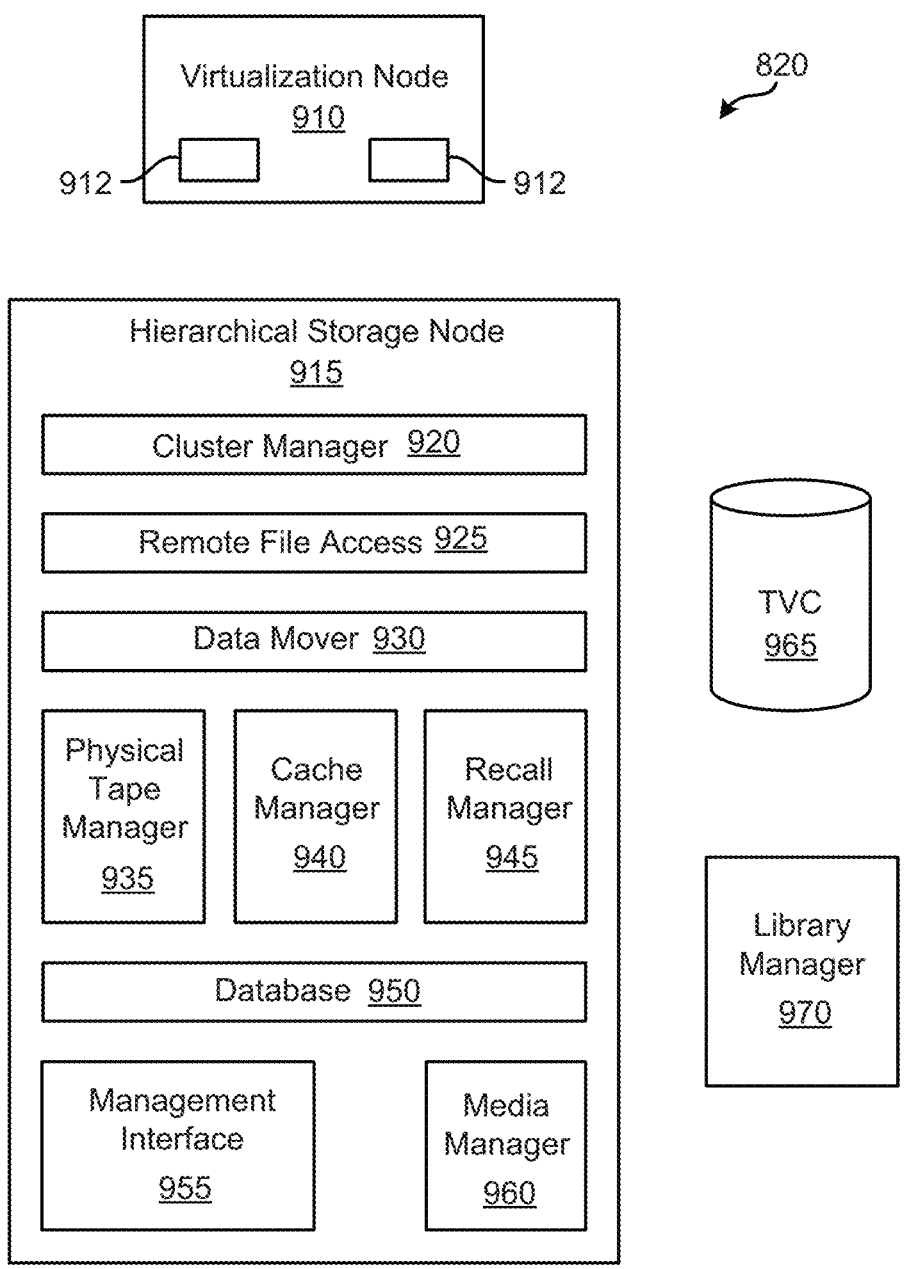
FIG. 9 is a schematic block diagram of a cluster according to one embodiment.

Additionally, FIGS. 7-9 illustrate exemplary embodiments that may be implemented in conjunction with features from any other embodiment listed herein, such as those described with reference to the other FIGS.

FIG. 7 is a schematic block diagram illustrating an embodiment of distributed sites 700 in accordance with the present invention. The distributed sites 700 include a plurality of sites 705a, 705b, 705c. Each of the sites 705a, 705b, 705c communicates with the other sites 705a, 705b, 705c over a network 710. The network 710 may include the Internet, local area network (LAN), wide area network (WAN), a dedicated network, a combination of networks, etc.

Each of the sites 705a, 705b, 705c may include one or more storage systems as will be described hereafter. In addition, each site 705a, 705b, 705c may include bridges, routers, and the like that connect the storage systems to the network 710.

FIGS. 8A-8B are schematic block diagrams of a storage system 800 in accordance with one embodiment. As an option, the present storage system 800 may be implemented in conjunction with features from any other embodiment listed herein, such as those described with reference to the other FIGS. Of course, however, such storage system 800 and others presented herein may be used in various applications and/or in permutations which may or may not be specifically described in the illustrative embodiments listed herein. Further, the storage system 800 presented herein may be used in any desired environment. Thus FIGS. 8A-8B (and the other FIGS.) should be deemed to include any and all possible permutations.

One or more storage systems 800 may be embodied in each of the sites 705a, 705b, 705c of FIG. 7. Moreover, the storage systems 800 may store data in different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology.

The storage systems 800 may store data in different forms, such as logical or virtual data. Herein, data may be organized in any of various forms, called "volumes" or "objects", the terms chosen without reference to any particular size or arrangement of data.

As illustrated in FIGS. 8A-8B, the storage system 800 provides storage for a plurality of host systems 810a, 810b. For example, the storage system 800 includes a plurality of hosts 810a, 810b, a plurality of clusters 820, and a network 815. Although for simplicity, two (2) hosts 810a, 810b, four (4) clusters 820a, 820b, 820c, 820d and one (1) network 815 are shown in FIG. 8A, any number of hosts 810a, 810b, clusters 820, and networks 815 may be employed. Accordingly, any number of clusters 820 may be included in storage system 800.

As illustrated in FIG. 8A, the storage system 800 may employ four (4) clusters 820a, 820b, 820c, 820d connected by a network 815 with each cluster 820 including a virtualization node ("VN") 860 and a storage device 830 for emulating a tape drive or tape library to hosts 810a, 810b. In an embodiment, clusters 820a, 820b, 820c, 820d are virtual tape server cluster.

Each cluster 820 includes a hierarchical storage node ("HSN") 850 for locally moving and/or transferring data between storage device 830 and library 840. In an embodiment, storage system 800 includes a disk storage 830 and a tape library 840. In an embodiment, the library 840 is an automated tape library ("ATL"). The HSN 850 may operate to remotely transfer data between the local disk storage 830 and the remote disk storage 830. The disk storage 830 may include one or more disk drives arranged as a RAID, JBOD, SSD or any combination thereof, for example.

Each cluster 820 includes a library manager 970 as illustrated in FIG. 9 with magnetic tapes as will be described hereafter. The hosts 810a, 810b may initiate and run tasks or jobs, such as tape jobs, in which data is read from and written to the magnetic tapes in the cluster families 880 and/or family members 820. The hosts 810a, 810b may be mainframe computers, servers, or the like. The hosts 810a, 810b may have the ability to run or host multiple operating systems. For example, the hosts 810a, 810b may run or may host multiple operating systems such Linux, Java, Windows or the like. Each of the hosts 810a, 810b of the storage system 800 may operate as the single mainframe computer, one or more servers, or as number of virtual machines. The hosts 810a, 810b may provide three levels of virtualization through logical partitions (LPARs) via the PR/SM facility, through virtual machines via the z/VM operating system, and through operating systems, notably z/OS with key-protected address spaces and goal-oriented workload scheduling.

The hosts 810a, 810b may communicate with the cluster 820 over the network 815 to access a plurality of magnetic tape drives, disk drives, and other storage devices through the cluster family members 820 as will be described hereafter. For example, a first host 810a may communicate over the network 815 to access a storage device and a magnetic tape through a first cluster 820a.

Each cluster 820 may include a hierarchical storage controller, such as hierarchical storage node 915, as illustrated in FIG. 9. The cluster 820 may provide a single point management for data to be read and stored, aggregating storage pools in which storage can easily be allocated to different hosts 810a, 810b, scaling the storage system 800 by adding storage or storage control nodes, and a platform for implementing advanced functions such as fast-write cache, point-in-time copy, transparent data migration, and remote copy.

The clusters 820 may follow an "in-band" approach. The in-band approach may cause all input/output (I/O) requests and all management and configuration requests to be processed through a cluster family member 820.

Each of the clusters 820 may be connected between themselves and with the hosts 810a, 810b over the network 815 to access data written on the magnetic tape and/or to write data to the magnetic tape. The plurality of clusters 820 may form a domain 805 of the storage system 800. The domain 805 may represent a multi-cluster or grid configuration. The domain 805 may include two or more clusters 820.

The network 815 of the storage system 800 may be storage area network (SAN), a token ring network, local area network (LAN), wide area network (WAN), the Internet, a dedicated network, a combination of networks, and the like. The SAN may consist of a "fabric" through which the hosts 810a, 810b may communicate with the clusters 820 over the network 815. The fabric may include a Fibre Channel network, an Ethernet network, or the like. All elements may not share the same fabric for communication. The first host 810a may communicate with the first cluster 820a over one fabric. In addition, the first host 810a may communicate with a third cluster 820c over another fabric.

Each storage system 800 may include a cluster family 880. The cluster family 880 may include a plurality of cluster family members 820 that are arranged, configured, organized, and/or grouped into the cluster family 880 For example, as illustrated in FIG. 8B, storage system 800 includes cluster family 880(1) and cluster family 880(2). Cluster family 880(1) includes a plurality of clusters 820a, 820b grouped into family members of cluster family 880(1). Cluster family 880(2) includes a plurality of cluster family members 820b, 820c grouped into family members of cluster family 880(2). Cluster family 880(1) and cluster family 880(2) communicate with each via network, such as network 710, 815. Each cluster family 880 may be given or assigned a name. For example, cluster family 880(1) may be named as City A and cluster family 880(2) may be named as City B.

Although, for simplicity, FIG. 8B illustrates a storage system 800 having two cluster families 880. Any number of storage systems 800, cluster families 880, and cluster family members 820 may be employed.

An example of a storage system 800 is the IBM® TS7700 Virtual Tape Server.

FIG. 9 is a schematic block diagram illustrating an embodiment of a cluster 820 according to one approach. The cluster 820 may represent a cluster family member 820 of cluster family 880 of FIGS. 8A and 8B, for example. The description of cluster 820 refers to elements of FIGS. 7-8B, like numbers referring to like elements. The cluster 820 may include a virtualization node 910, a hierarchical storage node 915, a volume cache 965, and a library manager 970.

The storage device 830 may include one or more disk drives, for example, arranged as a redundant array of independent disks (RAID) or just a bunch of disks (JBOD), or solid state disk (SSD), etc. The storage device 830 may include the volume cache 965. The volume cache 965 may serve as a virtual volume cache and/or tape volume cache (TVC).

For example, storage device 830 includes a virtual volume cache 965. The virtual volume cache 965 may serve as a TVC, wherein the TVC includes a rapidly accessible storage device such as a hard disk drive. In an embodiment, cluster 820 operates to cache data to the TVC 965.

The TVC 965 may cache data that is read from the logical volume and/or cache data that is to be written to the logical volume. One or both of the hosts 810a, 810b may make repeated writes to a logical volume. The TVC 965 may store the written data on a hard disk drive 830 without writing the data to the logical volume's magnetic tape. At a later time, the TVC 965 may write the cached data to the magnetic tape within tape library 840. Accordingly, operations such as read operations and write operations for a virtual tape drive mounting a logical volume may be routed through the TVC 965.

One or both of the hosts 810a, 810b may initiate and run task and/or jobs on the cluster 820. For example, a first host 810a access may result in an actuator of the library manager 970 being controlled by a physical tape manager 935 to transfer a tape cartridge from a storage area to a tape drive in order to access data written on the magnetic tape and/or to write data to the magnetic tape and/or TVC 965.

The virtualization node 910 may be an independent processor-based server with multiple connections to the network 815. The virtualization node 910 may include either a battery backup unit (BBU) and/or may have access to an uninterruptible power supply (UPS). The virtualization node 910 may contain a watchdog timer. The watchdog timer may ensure that a failing virtualization node 910 that is not able and/or takes a long time to recover may be restarted.

The virtualization node 910 may include one or more tape daemon 912. The tape daemon 912 may emulate a tape drive of the cluster 820 to one of the hosts 810a, 810b as a virtual tape drive. The tape daemon 912 may operate on a file that is either on the TVC 965 and/or may operate on a file in a remote TVC 965 of another cluster 820 through a remote file access 925.

The hierarchical storage node 915 may include a cluster manager 920, the remote file access 925, a data mover 930, the physical tape manager 935, a cache manager 940, a recall manager 945, a database 950, a management interface 955, and a media manager 960. The cluster manager 920 may coordinate operations between the plurality of clusters 820 in a multi-cluster or grid topology.

The cluster manager 920 may use tokens to determine which cluster 820 has a current copy of the data. The tokens may be stored in the database 950. The cluster manager 920 may also coordinate copying data between the clusters 820. The cluster manager 920 may include one or more processors configured to execute computer readable programs as is well known to those of skill in the art.

The remote file access 925 may be a server, one or more processors, or the like. The remote file access 925 may provide a link to the TVC 965 for access by any remote cluster 820. The cluster manager 920 may include a computer readable program.

The data mover 930 may control the actual data transfer operations for copies performed between clusters 820 and also may transfer of data between physical tape media and the TVC 965. The data mover 930 may include a computer readable program.

The physical tape manager 935 may control the physical tapes in the cluster 820. The physical tape manager 935 may manage the physical tapes in multiple pools, reclamation, borrowing and returning of volumes from and to a common scratch pool, and transfer tapes between pools. The physical tape manager 935 may include a computer readable program.

The cache manager 940 may control the copying of data from the TVC 965 to the physical tapes and the subsequent removal of a redundant copy of data from the TVC 965. The cache manager 940 may also provide the control signals to balance data flow between the different components and the TVC 965. The cache manager 940 may include a computer readable program.

The recall manager 945 may queue and control recall of data into the TVC 965 from physical media for either a virtual tape drive or copies requested by the cluster manager 920. The recall manager 945 may include a computer readable program.

The database 950 may be a structured collection of records that may be stored on a hard disk drive. The records may include the locations of data on magnetic tape. One of the hosts 810a, 810b may write the data to the magnetic tape of the cluster 820 and/or may access the data from the magnetic tape using database addresses to provide the data to a user.

The management interface 955 may provide information about the cluster 820 to the user. Also, the management interface 955 may allow the user to control and configure the cluster 820. The management interface 955 may include a computer cathode ray tube (CRT), a liquid crystal display (LCD) screen, a keyboard, or the like, or exist as a web based interface.

The media manager 960 may manage the physical handling of the magnetic tapes of the cluster 820. Also, the media manager 960 may manage error recovery of the magnetic tapes of the cluster 820. The media manager 960 may diagnose errors and may determine if the errors are caused by the physical tape drives or by the physical tape media. Further, the media manager 960 may take appropriate action for error recovery.

The library manager 970 may include plurality of physical tape drives, a robotic accessor, and a plurality of physical tape media. The robotic accessor of the library manager 970 may transfer the magnetic tape to a tape drive assigned to the TVC 965. A virtual tape drive may be a logical construct that appears to the host(s) 810a, 810b as a physical tape drive. The data may be read from or written to the magnetic tape of the tape drive through a read/write channel as is well known to those skilled in the art.

Each tape drive of the plurality of clusters 820 may employ one or more magnetic tapes to store the data. The magnetic tape may act as a storage media of the data in the storage system 800. The cluster 820 may employ any number of tape drives and magnetic tapes. For example, the storage system 800 may employ two (2) tape drives and two hundred fifty six (256) virtual drives.

The TVC 965 may contain data from tape volumes being operated on and stores additional volume data for rapid access. Operations such as read operations and write operations for a virtual tape drive mounting a volume may be routed through the TVC 965. Thus selecting a cluster 820 may select the cluster's TVC 965. All the magnetic tapes of the tape drive may be organized as one or more logical volumes or volumes. The volumes in the TVC 965 may be managed using a first in first out (FIFO) and/or a least recently used (LRU) algorithm.

The TVC 965 may be a rapidly accessible storage device. For example, the TVC 965 may be a hard disk drive with a storage capacity of five thousand four hundred gigabytes (5400 GB) or the like. In the storage system 800, the tape drive may cache data to the TVC 965 that is to be read from the logical volume and/or may cache data that is to be written to the logical volume. For example, one of the hosts 810a, 810b may make repeated writes to a virtual tape drive. The TVC 965 may store the written data on the hard disk drive without writing the data to the virtual magnetic tape. At a later time, the cache manager 940 may write the cached data to the magnetic tape of the cluster 820.

The virtualization node 910 that accessed a volume may be referred to as a mount-point. Choosing a remote cluster TVC 965 that was used for a recent mount-point for a logical volume may improve access to the volume. The high-availability, fast-write storage of the TVC 965 allows the hosts 810a, 810b to write data to the TVC 965 without having to wait for the data to be written to a physical disk.

In an embodiment, each of the sites 705a, 705b, 705c comprises a storage system 800. Each storage system 800 comprises two or more cluster family members 820 grouped together to create a cluster family 880. For example, cluster family 880(1) comprises a group of cluster family members 820a and 820b and cluster family 880(2) comprising a group of cluster family members 820c and 820d. Cluster family 880(1) may be used for production purposes and cluster family 880(2) may be used for DR or archival purposes, for example. Accordingly, cluster families 880 may perform different roles with respect to other cluster families 880. In addition, cluster family members 820 of a cluster family 880 may perform different roles with respect to each other within the cluster family 880. Accordingly, cluster family members 820 of a cluster family 880 may perform different roles with respect to non-family members.

In an embodiment, cluster families 880 may be configured at global distances, metro distances, or combinations thereof. Similarly, cluster family members 820 may be configured at global distances, metro distances, or combinations thereof. In addition, the cluster family members 820 may have different distant ratings from each other in a cluster family 880. Similarly, cluster families 880 may have different distant ratings between each other. While distant ratings may be used as a factor to define roles and relationships between cluster families 880 and cluster family members 820, this is but just a factor in bringing relationship awareness between the cluster family members 820 and cluster families 880. Thus, arranging or grouping clusters 820 into cluster family members of a cluster family 880 is not limited to distances.

Additionally, because each storage system 800 includes a cluster family 880 created by grouping two or more clusters 820 into family members, each storage system 800 or combination of storage systems 800 may represent a multi-cluster configuration or grid.

Furthermore, the clusters 820 of storage system 800 may form distributed store configuration. For example, a second cluster 820b may create a secondary instance of a volume. The secondary instance may be synchronized with the primary copy on a first cluster 820a, wherein the secondary copy is updated any time the primary copy is updated. The secondary instance may be stored in another cluster family 880 located at a remote site, e.g., 705a, 705b, 705c, in order to ensure availability of data in case the primary instance becomes unavailable. Future mount-point accesses may choose the secondary copy as the primary copy. Transparent data migration may be used when adding, removing, and/or rebalancing data to magnetic tape.

Although implementations of various approaches are discussed in reference to FIGS. 7-8B, this is only for illustration purposes. One skilled in the art will appreciate that the various embodiments described herein are not limited to any specific grid configuration and may be implemented in any multi-cluster or grid configuration. For example, one or more clusters 820 from site 705a may be grouped with one or more clusters 820 from a different site, such as site 705b, to create a first cluster family 880. Likewise, one or more clusters 820 from site 705c and site 705a may be grouped in family members to create a second cluster family 880. Hence, any combination of clusters 820 may be grouped into family members to create a cluster family 880.

Again, the foregoing in-use embodiment is presented as an example and is in no way intended to limit the invention.

According to other embodiments, data incoming to and/or generated at more than one production site may be copied to a single backup reserve site when remote copy sites corresponding to the more than one production site become unavailable. Therefore, any of the embodiments described herein may be broadened to facilitate copying data from more than one production site, but is in no way limited thereto. Moreover, additional embodiments may include alternate backup reserve sites, e.g., to replace a primary backup reserve site if it becomes unavailable. A remote mount and/or the network itself may coordinate the connection between the production site and the alternate backup reserve sites if the primary backup reserve site becomes unavailable. Such embodiments may provide added security, e.g., for situations having high priority.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    copying data incoming to and/or generated at a production site to a copy cluster at a remote copy site, thereby creating a redundant copy of the data at the copy cluster;
    when the copy cluster becomes unavailable, copying data incoming to and/or generated at the production site to a backup reserve site after the copy cluster becomes unavailable;
    setting the backup reserve site as a new primary remote copy site for the production site when the copy cluster becomes unavailable; and
    copying the data stored on the backup reserve site to the copy cluster of the remote copy site when the copy cluster becomes available,
    wherein a temporary ownership of the data at the backup reserve site is removed when the data is copied to the copy cluster,
    wherein a permanent ownership of the data by the copy cluster is set when the copying completes,
    wherein the production site receives indication that the ownership of the copied data resides with the copy cluster.

2. The method of claim 1, wherein the production site, remote copy site and backup reserve site are connected in a grid-type system, wherein the remote copy site and the backup reserve site are geographically separated from the production site.

3. The method of claim 1, comprising selecting the backup reserve site from a plurality of backup reserve sites based on predefined criteria, wherein the predefined criteria include one or more of: a distance separating the backup reserve site from the remote copy site and/or production site, a data storage size of the backup reserve site, and a data storage media type associated with the backup reserve site.

4. The method of claim 1, comprising copying data incoming to and/or generated at the production site to the copy cluster at the remote copy site and discontinuing copying the data to the backup reserve site when the copy cluster becomes available, wherein the data copied to the backup reserve site is maintained as a redundant copy of the data on the production site, wherein the data is not transferred to the remote copy site.

5. The method of claim 1, comprising copying data incoming to and/or generated at the production site to the copy cluster at the remote copy site and discontinuing copying the data to the backup reserve site when the copy cluster becomes available, wherein the data stored on the backup reserve site is maintained on the backup reserve site as a second redundant copy of the data at the copy cluster, wherein when the data stored on the backup reserve site is copied to the copy cluster is based on activity at the copy cluster.

6. The method of claim 1, comprising setting the copy cluster as a new backup reserve site when the copy cluster becomes available again.

7. The method of claim 1, wherein when the data stored on the backup reserve site is copied to the copy cluster is based on activity at the copy cluster.

8. A computer program product comprising a computer readable storage medium having program instructions embodied therewith, the program instructions readable and/or executable by a device to cause the device to:
    copy data incoming to and/or generated at a production site to a copy cluster at a remote copy site, thereby creating a redundant copy of the data at the copy cluster;
    when the copy cluster becomes unavailable, copy data incoming to and/or generated at the production site after the copy cluster becomes unavailable to a backup reserve site;
    set the backup reserve site as a new primary remote copy site for the production site when the copy cluster becomes unavailable; and
    copy the data stored on the backup reserve site to the copy cluster of the remote copy site when the copy cluster becomes available,
    wherein a temporary ownership of the data at the backup reserve site is removed when the data is copied to the copy cluster,
    wherein a permanent ownership of the data by the copy cluster is set when the copying completes,
    wherein the production site receives indication that the ownership of the copied data resides with the copy cluster.

9. The computer program product of claim 8, wherein the production site, remote copy site and backup reserve site are connected in a grid-type system, wherein the remote copy site, the backup reserve site, and the production site are geographically separated from each other.

10. The computer program product of claim 8, wherein the program instructions readable and/or executable by the device further causes the device to:
    select the backup reserve site from a plurality of backup reserve sites based on predefined criteria, wherein the predefined criteria include one or more of: a distance separating the backup reserve site from the remote copy site and/or production site, a data storage size of the backup reserve site, and a data storage media type associated with the backup reserve site.

11. The computer program product of claim 8, wherein the program instructions readable and/or executable by the device further causes the device to:
    copy data incoming to and/or generated at the production site to the copy cluster at the remote copy site and discontinuing copying the data to the backup reserve site when the copy cluster becomes available, wherein the data copied to the backup reserve site is maintained as a redundant copy of the data on the production site, wherein the data is not transferred to the remote copy site.

12. The computer program product of claim 8, wherein the program instructions readable and/or executable by the device further causes the device to:

set the copy cluster as a new backup reserve site when the copy cluster becomes available again.

13. The computer program product of claim 8, wherein when the data stored on the backup reserve site is copied to the copy cluster is based on activity at the copy cluster.

14. A system, comprising:

a hardware processor and logic integrated with and/or executable by the hardware processor, the logic being configured to:

copy data incoming to and/or generated at a production site to a copy cluster at a remote copy site, thereby creating a redundant copy of the data at the copy cluster;

when the copy cluster becomes unavailable, set a backup reserve site as a new primary remote copy site for the production site, and copy data incoming to and/or generated at the production site after the copy cluster becomes unavailable to the backup reserve site;

select the backup reserve site from a plurality of backup reserve sites based on predefined criteria; and copy the data stored on the backup reserve site to the copy cluster of the remote copy site when the copy cluster becomes available, wherein a temporary ownership of the data at the backup reserve site is removed when the data is copied to the copy cluster, wherein the production site, remote copy site and backup reserve site are connected in a grid-type system.

15. The system of claim 14, the logic being further configured to copy data incoming to and/or generated at the production site to the copy cluster at the remote copy site and discontinuing copying the data to the backup reserve site when the copy cluster becomes available; and deleting the data stored on the backup reserve site after copying the data stored on the backup reserve site to the copy cluster of the remote copy site.

16. The system of claim 14, the logic being further configured to designate the copy cluster as the new backup reserve site when the copy cluster becomes available again, wherein the predefined criteria include one or more of: a distance separating the backup reserve site from the remote copy site and/or production site, a data storage size of the backup reserve site, and a data storage media type associated with the backup reserve site.

* * * * *